Figure 1:
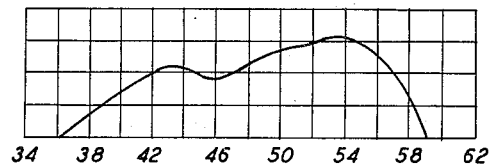
Figure 2:
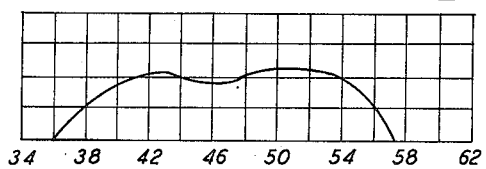
Figure 3:
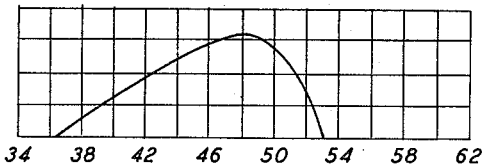
Figure 4:
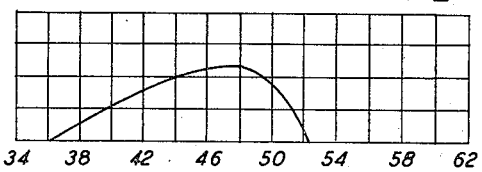
Figure 5:
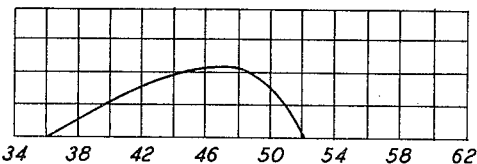

March 13, 1951

A. W. ANISH ET AL 2,545,421

PHOTOGRAPHIC LIGHT SENSITIVE ELEMENTS
CONTAINING AZANOL DYES

Original Filed Oct. 5, 1946

ALFRED W. ANISH
LEE C. HENSLEY
INVENTORS

BY
ATTORNEYS

Patented Mar. 13, 1951

2,545,421

UNITED STATES PATENT OFFICE 2,545,421

PHOTOGRAPHIC LIGHT SENSITIVE ELEMENTS CONTAINING AZANOL DYES

Alfred W. Anish, Vestal, and Lee C. Hensley, Binghamton, N. Y., assignors to General Aniline & Film Corporation, New York, N. Y., a corporation of Delaware Original application October 5, 1946, Serial No. 701,424. Divided and this application August 11, 1949, Serial No. 109,684

9 Claims. (Cl. 95—7)

This invention relates to sensitizing dyes for light-sensitive photographic elements, and particularly to azanol dyes as sensitizers for silver halide emulsions.

Sensitizing dyes, comprising two heterocyclic nitrogenous nuclei linked by a chain of atoms including one or more nitrogen atoms, are known. These dyes are prepared by condensing a quaternary cyclammonium cyanine dye intermediate, containing an active group in the alpha or gamma position, with a diamine, such as, for example, hydrazine, ethylene diamine, p-phenylene diamine, and the like. These condensation products are, for the most part, insoluble in aqueous solutions of inorganic bases and do not form metal salts with such bases. Moreover, these products are incapable of forming heavy metal salts.

We have discovered that by condensing a 5- or 6-membered keto-heterocyclic compound, containing a reactive group, with an aliphatic, aromatic or heterocyclic diamine while heating in the presence of an alcohol as a solvent-diluent with or without a tertiary base, new dyes are obtained which are not only soluble in aqueous solutions of inorganic bases, but also form stable heavy metal salts, particularly silver salts. The silver salts are non-diffusing and readily dischargeable in the usual processing baths. These properties make the dyes valuable as sensitizing dyes.

Accordingly, it is an object of the present invention to provide a new class of azanol dyes as sensitizing dyes for light sensitive photographic elements.

A further object is to provide sensitizing dyes which have no deleterious effect on the photographic properties of the film.

Other objects and advantages of this invention will become apparent by reference to the following specification in which its preferred details and embodiments are described.

The azanol dyes prepared according to the present invention are characterized by the following general formula:

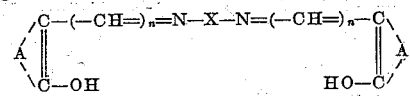

wherein A represents the atoms necessary to complete a 5-membered or 6-membered heterocyclic nucleus, e. g., of a barbituric acid, a thio-barbituric acid, a rhodanine, an oxazoledione, a thiozolone, a pyrazolone, a hydantoin, a thiohydantoin, and the like, n represents a positive odd integer not greater than 3, and N—X—N is the radical of a primary diamine, said diamine being hydrazine, an aliphatic, aromatic, or heterocyclic diamine containing not more than 14 carbon atoms. For instance, when the primary diamine is aromatic, the compounds have the following structure:

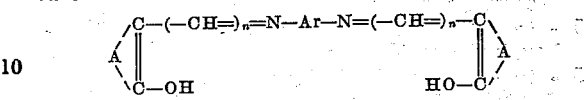

wherein Ar represents an aromatic radical containing up to 12 carbon atoms.

The process of preparing the above azanol dyes comprises heating, preferably under reflux conditions, with or without a tertiary base, an alcoholic solution of hydrazine, or an aliphatic, aromatic or heterocyclic diamine with a 5-membered or 6-membered heterocyclic intermediate derived from a barbituric acid, a thiobarbituric acid, a rhodanine, a hydantoin, a thiohydantoin, an oxazoledione, a thiazolone, a pyrazolone, and the like, having a reactive acetanilido group linked to a carbon atom of a mono- or polymethine chain of not more than 3 carbon atoms adjacent to a keto group of such intermediate.

The diamines used in the preparation of the new dyes of the present invention, and having the general formula:

$$H_2N—X—NH_2$$

wherein N—X—N has the same significance as above, are the following:

Hydrazine
Ethylenediamine
o- and p-Phenylenediamine
1,5-naphthylenediamine
2:2'-, 2:4'-, and 4:4'-diaminostilbene
4,4'-diamino-3,3'-dichlorophenylmethane
4,4'-diamino-benzophenone
4,4'-diamino-3,3'-dimethoxydiphenylmethane
p-p'-Diamino-diphenylmethane
2,6-diamino-pyridine
2,5-diamino-thiodiazole
2,4-diamino-quinoline
2,4-diamino-6-thio-3,5-thiadiazine The 5-membered heterocyclic intermediates derived from a rhodanine, a thiazolone, a hydantoin, an oxazoledione and a pyrazolone are described in United States Patent 2,186,608 and represented by the general formula:

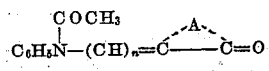

wherein A and $n$ have the same significance as above. As illustrative of compounds represented by this general formula, reference is made to:

4 - ($\gamma$ - acetanilidoallylidene) - 1 - (2) - benzothiazolyl - 3 - methyl - 5 - pyrazolone
4 - acetanilidomethylene - 3 - methyl - 1 - phenyl-5-pyrazolone
4 - ($\gamma$ - acetanilidoallylidene) - 3 - methyl - 1 - phenyl-5-pyrazolone
4 - acetanilidomethylene - 3 - methyl - 1 - (2) - pyridyl-5-pyrazolone
3 - acetanilidomethylene - 5 - methyl - thiophen-2-one
5-acetanilidomethylene-3-allylrhodanine
5-acetanilidopropanylidene-3-allylrhodanine
5-acetanilidomethylene-3-phenylrhodanine
5-acetanilidomethylene-3-ethylrhodanine
5 - acetanilidomethylene - 3 - ethyl - 2 - thio - 2,4(3,5)-oxazoledione
5 - ($\gamma$ - acetanilidoallylidene) - 2 - diphenyl - amino-4(5)-thiazolone
5 - ($\gamma$ - acetanilidoallylidene) - 3 - ethyl - 2 - thio-2,4(3,5)-oxazoledione
5 - ($\gamma$ - acetanilidoallylidene) - 3 - ethyl - 1 - phenyl-2-thiohydantoin
5 - (5 - acetanilido - $\Delta$2,4 - pentadienylidene) - 3-ethylrhodanine
5 - ($\gamma$ - acetanilidoallylidene) - 2,4,6 - triketohexahydropyrimidine
5 - ($\gamma$ - acetanilidoallylidene) - 2 - thio - 4,6 - diketohexahydropyrimidine, and the like.

As solvent-diluents employed in the preparation of the new dyes of the present invention, the following alcohols may be employed: methyl, ethyl, propyl, isopropyl, butyl, benzyl, furfuryl alcohol, and the like. Triethylamine, tributylamine, and the like are representative of the tertiary bases which we may use.

When 1 mol of a diamine, of the type mentioned above, is condensed with 1 mol of a 5-membered or 6-membered heterocyclic intermediate in the presence of an alcohol, with or without a tertiary base as a catalyst, a reaction occurs which may be written as follows:

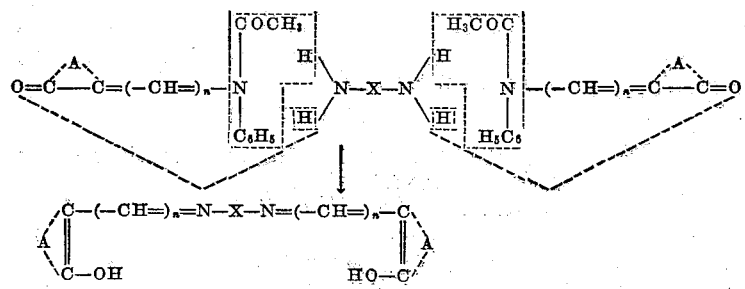

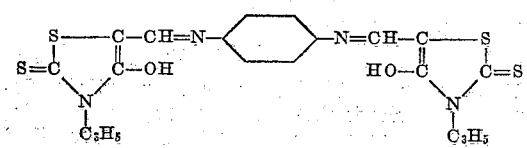

The following examples describe in detail the methods for accomplishing the above objects, but it is to be understood that they are inserted merely for the purpose of illustration and are not to be construed as limitative.

*Example I*

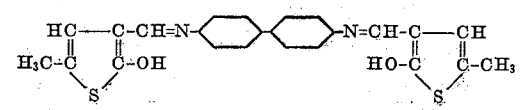

A mixture of 3.2 grams (0.01 mol) of 5-acetanilido-methylene-3-allylrhodanine, 0.6 gram (0.005 mol+10%) of p-phenylenediamine, 125 cc. of isopropyl alcohol and 0.5 cc. of triethylamine was refluxed on a steam bath for about 1 hour, during which time the dye separated from the hot alcohol. The mixture was filtered while hot, and the filter residue boiled out twice with 100 cc. portions of methanol. The dye was further purified by dissolving it in N/1-caustic solution, filtering the solution carefully, and precipitating with dilute acetic acid.

The dye sensitized a silver chlorobromide emulsion to 590 m$\mu$, with a maximum at 545 m$\mu$.

*Example II*

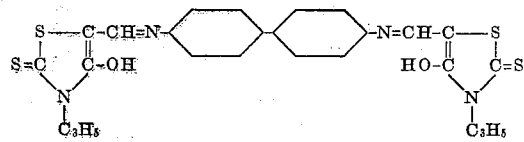

In a manner similar to that used in the preparation of the dye described in Example I, 0.4 gram of benzidine was reacted with 1.2 grams of 5-acetanilidomethylene-3-allylrhodanine. This dye sensitized a silver chlorobromide emulsion to 570 m$\mu$, with a maximum at 520 m$\mu$.

*Example III*

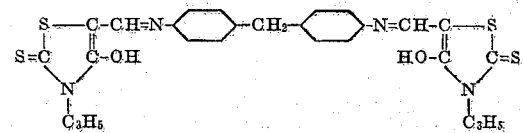

By reacting 0.4 gram of p,p'-diamino-diphenylmethane with 1.2 grams of 5-acetanilidomethylene-3-allylrhodanine in isopropyl alcohol, according to the method of Example I, a yellow dye was obtained. This dye sensitized a silver chlorobromide emulsion to 530 m$\mu$, with a maximum at 480 m$\mu$.

*Example IV*

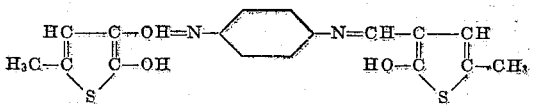

While following the procedure of Example I, 1.0 gram of p-phenylene diamine and 10.0 grams of 3-acetanilidomethylene - 5 - methyl-thiophen-2-one were reacted in 150 cc. of isopropyl alcohol in the presence of 1 cc. of triethylamine. The resulting dye sensitized a silver chlorobromide emulsion to 530 m$\mu$, with a maximum at 510 m$\mu$.

*Example V*

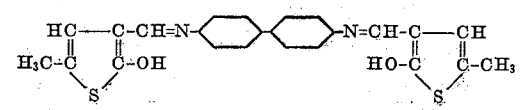

While following the procedure of Example I, 0.2 gram of benzidine and 1.0 gram of 3-acetanilidomethylene-5-methyl-thiophen-2-one were reacted in 15 cc. of isopropyl alcohol in the presence of several drops of triethylamine. The resulting dye sensitized a silver chlorobromide emulsion to 520 m$\mu$, with a maximum at 480 m$\mu$.

Example VI

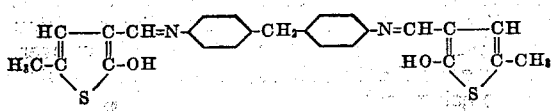

1.0 gram of 3-acetanilidomethylene-5-methyl-thiophen-2-one, 0.5 gram of p,p'-diamino-diphenylmethane and 15 cc. of isopropyl alcohol, containing several drops of triethylamine, were heated under reflux for one hour. The resulting dye sensitized a silver chlorobromide emulsion to 520 m$\mu$, with a maximum at 480 m$\mu$.

Example VII

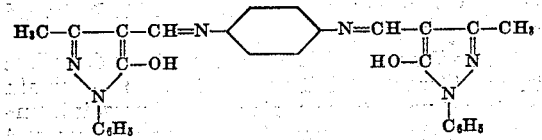

3.0 grams of 4-acetanilidomethylene-1-phenyl-3-methyl-5-pyrazolone and 0.5 gram of p-phenylenediamine were reacted together in 70 cc. of isopropyl alcohol in the presence of a few drops of triethylamine. The resulting dye sensitized a

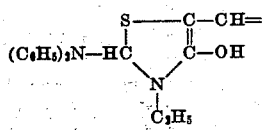

silver chlorobromide emulsion to 520 m$\mu$, with a maximum at 470 m$\mu$.

Example VIII

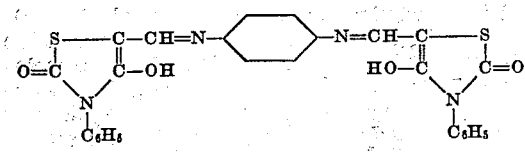

1.0 gram of p-phenylenediamine and 4.0 grams of 5-acetanilidomethylene-3-phenyl-2,4-thiazoledione were reacted in 150 cc. of isopropyl alcohol in the presence of 1 cc. of triethylamine. The resulting dye sensitized a silver chlorobromide emulsion to 530 m$\mu$, with a maximum at 510 m$\mu$.

Example IX

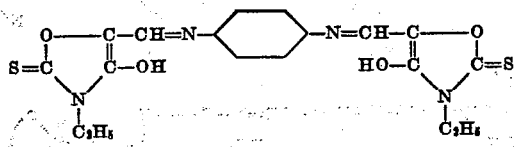

1.0 gram of p-phenylenediamine and 4.0 grams of 5-acetanilidomethylene-3-phenyl-2,4-thiazoledione were reacted in 150 cc. of isopropyl alcohol in the presence of 1 cc. of triethylamine. The resulting dye sensitized a silver chlorobromide emulsion to 530 m$\mu$, with a maximum at 510 m$\mu$.

Example X

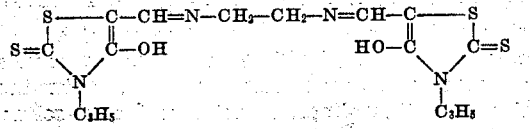

6.0 grams each of 5-acetanilidiomethylene-3-allyl-rhodanine and ethylene diamine were dissolved in 250 cc. of isopropyl alcohol, and the mixture refluxed for 1 hour. During this time, a yellow solid separated. After cooling, the reaction mixture was filtered off and the dye recrystallized from methanol. The dye sensitized a silver chlorobromide emulsion to 480 m$\mu$, with a maximum at 440 m$\mu$.

Example XI

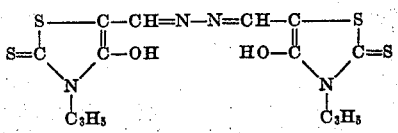

A mixture of 6.0 grams of 5-acetanilidomethylene-3-allylrhodanine, 0.5 gram of an 85% aqueous solution of hydrazine hydrate, 25 cc. of isopropyl alcohol, and one drop of triethylamine were refluxed for 1 hour. The pale yellow precipitate, which formed, was filtered off and boiled out with several portions of methanol. The insoluble portion was recrystallized from methanol. The dye sensitized a silver chlorobromide emulsion to 470 m$\mu$, with a maximum at 430 m$\mu$.

Example XII

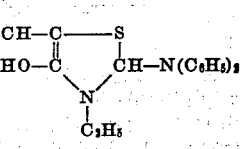

A mixture of 4.4 grams of 5-($\gamma$-acetanilidoallylidene)-2-diphenylamino-3-ethyl-4(5)-thiazolone, 1.0 gram of p-phenylenediamine, 125 cc. of isopropyl alcohol and 0.5 cc. of triethylamine were refluxed on a steam bath for about 1 hour, during which time the dye separated from the hot alcohol. The mixture was filtered while hot and the filter residue boiled out twice with 100 cc. portions of methanol. The dye was further purified by dissolving it in N/1-caustic solution, filtering the solution carefully and precipitating with dilute acetic acid.

Example XIII

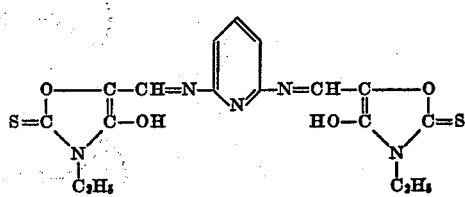

3.0 grams of 5-(acetanilidomethylene)-3-ethyl-2-thio-2,4(3,5)-oxazoledione, and 1.1 grams of 2,6-diamino-pyridine were mixed with 20 cc. of isopropyl alcohol containing 1 cc. of triethylamine. The mixture was boiled, under reflux, for 1½ hours, cooled and then diluted with 15 cc. of water. The dye which separated was boiled out twice with ethyl alcohol and then dried.

Example XIV

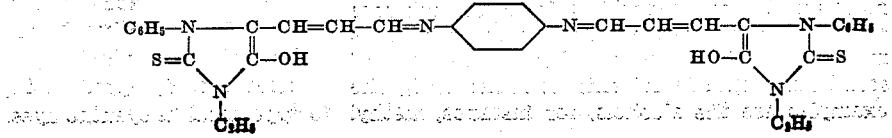

3.0 grams of 5-(γ-acetanilidoallylidene)-3-ethyl-1-phenyl-2-thiohydantoin and 1.0 gram of p-phenylenediamine were dissolved in 70 cc. of isopropyl alcohol, containing about 1 cc. of triethylamine, and the mixture heated under reflux for about 1 hour. After cooling to room temperature, the mixture was filtered and the residue boiled out twice with 100 cc. of methanol.

Example XV

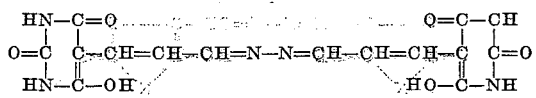

A mixture of 3.0 grams of 5-(γ-acetanilidoallylidene)-2,4,6-triketohexahydropyrimidine, 0.5 gram of an 85% aqueous solution of hydrazine hydrate and 50 cc. of isopropyl alcohol, containing 1 drop of triethylamine, were refluxed for 1 hour. After cooling to room temperature, the solid product which separated out was segregated from the supernatant liquid by decantation. The solid was boiled out twice with 95% methyl alcohol and then dried.

Example XVI

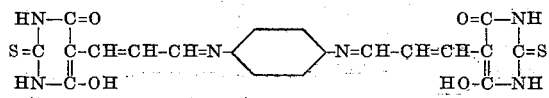

A mixture of 3.1 grams of 5-(γ-acetanilidoallylidene)-2-thio-4,6-diketohexahydropyrimidine, 1.0 gram of p-phenylenediamine and 50 cc. of isopropyl alcohol and 1 drop of triethylamine were refluxed for 1 hour. The solid which precipitated was filtered off and boiled with several portions of methanol.

The diagrammatic spectrograms constituting the accompanying drawing illustrate the regions of the spectrum to which some of the azanol dyes of the present invention will sensitize a silver-chlorobromide emulsion containing about 4-5% of silver halide and the extent of the sensitization at various wavelengths. The five figures of this drawing illustrate the sensitizing properties of the dyes prepared in accordance with Examples 1 to 3 and 5 to 6.

In the preparation of emulsions containing these azanol dyes, the dye may be dissolved in methyl or ethyl alcohol, and a volume of this solution containing from 5 to 50 milligrams added to a liter of emulsion.

While in general practice it may not be necessary to add the dye in amounts larger than those above given, generally, for satisfactory results, amounts usually ranging from 5 to 25 milligrams are sufficient to obtain the maximum sensitizing effect. However, we do not wish to limit our invention to the quantities just indicated as the most suitable amount will be found in each case by a few comparative experiments. The dyes may be added to the emulsion in the form of solutions. Suitable solvents as indicated in the examples are the alcohols, for instance, methyl or ethyl alcohol which may be anhydrous or diluted with a small volume of water. In actual practice, the dyes are applied to the emulsion during any stage of its production. However, they are preferably added to the finished emulsion before being cast.

The above examples are illustrative only, and should not be construed as limiting the invention, since it will be apparent to those skilled in the art that the dyes of the present invention may be incorporated into photographic emulsions by methods other than those described herein.

This application is a division of our copending application Serial No. 701,424, filed October 5, 1946, now United States Patent 2,496,841, issued February 7, 1950.

While the present invention has been described in considerable detail with reference to certain preferred procedures, materials and uses, it is understood that the new class of azanol dyes and their use as sensitizing dyes is not limited thereto, and that numerous variations and modifications described in the foregoing specification may be made, as, for example, the dyes which contain a keto-heterocyclic nucleus, e. g., oxazoledione, hydantoin, and rhodanine nucleus, as illustrated in Examples 1-3, 8-10, and 13-15 inclusive, may be further treated with a quaternizing compound such as methyl iodide. The quaternized compound is then condensed under reflux conditions with a cyclammonium base or salt usual in cyanine dyes, such as N-methyl-2-methylbenzthiazole, having a reactive methyl group in the α-position to the nitrogen atom in the presence of a condensing agent such as pyridine, quinoline and the like. In the first reaction (alkylation), the azanol dye is modified to the extent that the nitrogen atom in the 3-position of the oxazoledione, hydantoin or rhodanine ring is quaternized and the sulfur atom in the 2-position is converted to a thioether group. In the second reaction (condensation), the alkylated azanol dye is condensed with a cyclammonium base or salt whereby new compounds, which are also useful as sensitizers, having the following general formulae, are obtained:

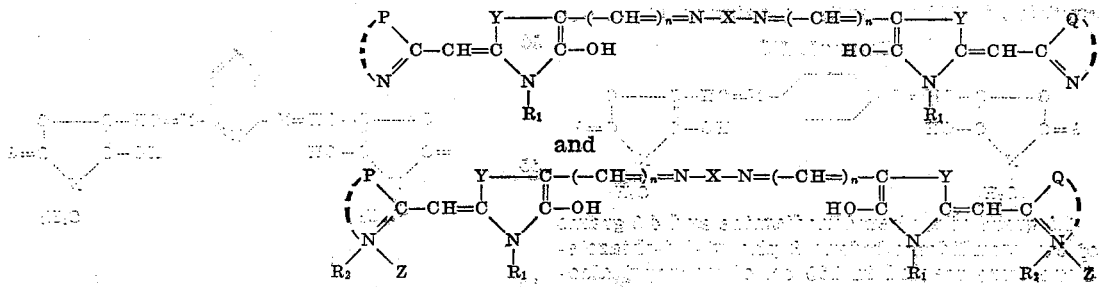

and wherein =N—X—N= and $n$ have the same values as above. $R_1$ represents an alkyl, alkylene or aryl radical, $R_2$ represents alkyl, P and Q, which may be the same or different, represent the atoms necessary to complete a heterocyclic ring system of the type usual in cyanine dyes, e. g., indolenines, lepidines, oxazoles, oxazolines, selenazoles, selenazolines, pyridine, quinoline, thiazoles, thiazolines, diazoles and quinazolines and the corresponding polycyclic compounds, such as benzthiazoles, benzselenazoles, naphthothiazoles, naphthoselenazoles, diazines, and the like. Y represents O, S, or N—$C_6H_5$, and Z represents a dye-precipitating acid radical of the type usual in cyanine dyes.

We claim:
1. A photographic light sensitive element which comprises a gelatino silver halide emulsion containing an azanol dye characterized by the formula:

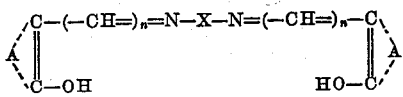

wherein A represents the atoms necessary to complete a member selected from the class consisting of a 5-membered and 6-membered heterocyclic ring system, $n$ represents a positive odd integer of from 1 to 3, and N—X—N is a radical of an amine containing two primary amino groups of not more than 14 carbon atoms and selected from the class consisting of hydrazine, aliphatic, aromatic and heterocyclic primary diamines.

2. A photographic light sensitive element which comprises a gelatino silver halide emulsion containing an azanol dye characterized by the formula:

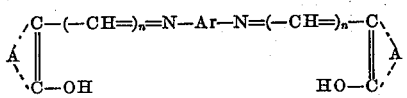

wherein A represents the atoms necessary to complete a member selected from the class consisting of a 5-membered and 6-membered heterocyclic ring system, $n$ represents a positive odd integer of from 1 to 3, and Ar represents an aromatic radical containing up to 12 nuclear carbon atoms.

3. A photographic light sensitive element which comprises a gelatino silver halide emulsion containing an azanol dye as defined in claim 2, wherein Ar is phenyl.

4. A photographic light sensitive element which comprises a gelatino silver halide emulsion containing an azanol dye characterized by the formula:

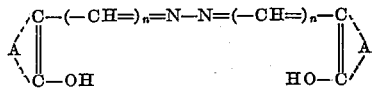

wherein A represents the atoms necessary to complete a member selected from the class consisting of a 5-membered and 6-membered heterocyclic ring system, and $n$ represents a positive odd integer of from 1 to 3.

5. A photographic light sensitive element which comprises a gelatino silver halide emulsion containing an azanol dye of the following formula:

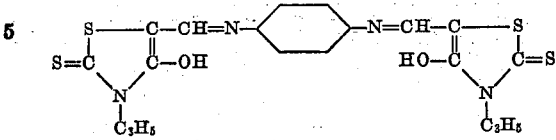

6. A photographic light sensitive element which comprises a gelatino silver halide emulsion containing an azanol dye of the following formula:

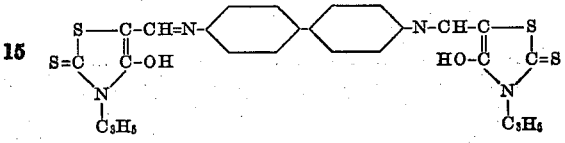

7. A photographic light sensitive element which comprises a gelatino silver-halide emulsion containing an azanol dye of the following formula:

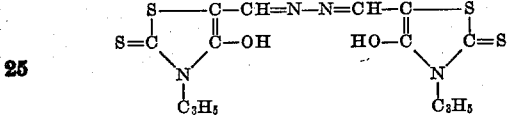

8. A photographic light sensitive element which comprises a gelatino silver halide emulsion containing an azanol dye of the following formula:

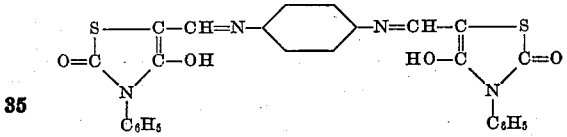

9. A photographic light sensitive element which comprises a gelatino silver halide emulsion containing an azanol dye of the following formula:

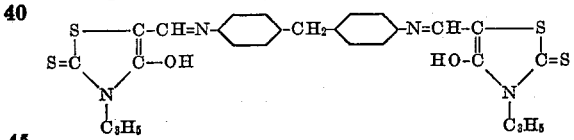

ALFRED W. ANISH.
LEE C. HENSLEY.

No references cited.